United States Patent
Vogel et al.

[11] Patent Number: 6,015,193
[45] Date of Patent: Jan. 18, 2000

[54] BRAKING AND STEERING SYSTEM FOR A VEHICLE

[75] Inventors: Thomas Vogel, Leonberg; Thomas Thurner, Kirchheim/Teck, both of Germany

[73] Assignee: DaimlerChrysler AG, Germany

[21] Appl. No.: 08/683,250

[22] Filed: Jul. 18, 1996

[30] Foreign Application Priority Data

Jul. 18, 1995 [DE] Germany .............................. 195 26 250

[51] Int. Cl.[7] .................................................. B62D 6/00
[52] U.S. Cl. ........................ 303/147; 303/9.75; 303/22.1; 303/140
[58] Field of Search ................................... 303/146–149, 303/22.1, 9.75, 140; 180/6.28, 405, 407

[56] References Cited

U.S. PATENT DOCUMENTS

| | | |
|---|---|---|
| 3,603,424 | 9/1971 | Blood et al. . |
| 3,877,537 | 4/1975 | Ohms et al. . |
| 3,888,328 | 6/1975 | Leiber ...................................... 303/147 |
| 4,039,041 | 8/1977 | Farrow ..................................... 303/9.75 |
| 4,140,201 | 2/1979 | Young ...................................... 303/22.1 |
| 5,351,776 | 10/1994 | Keller et al. . |

FOREIGN PATENT DOCUMENTS

| | | |
|---|---|---|
| 314 641A2 | of 1989 | European Pat. Off. . |
| 714334 | 11/1941 | Germany . |
| 2120745 | 4/1971 | Germany . |
| 2 120 745 | 11/1972 | Germany . |
| 40 41 404 | 7/1991 | Germany . |
| 40 22 671 | 1/1992 | Germany . |
| 4123234 C1 | 8/1992 | Germany . |
| 42 27 157 A1 | 3/1993 | Germany . |
| 41 34 240 A1 | 4/1993 | Germany . |
| 4232256 A1 | 4/1993 | Germany . |
| 42 07 719 A1 | 9/1993 | Germany . |
| 43 34 260 | 4/1994 | Germany . |
| 4302670 A1 | 8/1994 | Germany . |
| 43 39 570 | 5/1995 | Germany . |
| 4438929 C1 | 10/1995 | Germany . |
| 61-215167 | of 1986 | Japan . |
| 193 247 | of 1990 | Japan . |
| 2-85059 | of 1990 | Japan . |
| 298 105 | of 1994 | Japan . |
| 56 015 | of 1994 | Japan . |
| 1 290 259 | 4/1970 | United Kingdom . |
| 2 205 009 | 5/1987 | United Kingdom . |

OTHER PUBLICATIONS

Article in 1993 "Frankfurt/Main" magazine Nr. 9, pp. 697–701.

*Primary Examiner*—Matthew C. Graham
*Attorney, Agent, or Firm*—Evenson, McKeown, Edwards & Lenahan, P.L.L.C.

[57] ABSTRACT

The invention relates to a braking and steering system for a vehicle which provides at least fail-safe braking and steering. In a fault-tolerant, preferably redundant, computing unit, a desired braking effect is determined at least for each wheel of the vehicle, and a desired steering effect is determined for each wheel with a steering function, in each case in response to sensor signals. The braking function and the steering function for the wheels are regulated or controlled by means of adjusting systems on the basis of the determined desired braking effect and desired steering effect. The adjusting system for the braking function contains a service brake and that for the steering function additionally contains a steering adjuster. A fault-tolerant communication device connects the adjusting systems to the computing unit. The energy supply of the computing unit and of the adjusting systems is designed with fault tolerance.

27 Claims, 3 Drawing Sheets

BRAKING AND STEERING SYSTEM FOR A VEHICLE

BACKGROUND AND SUMMARY OF THE INVENTION

The invention relates to a braking and steering system for a motor vehicle, having a steered front axle and a separate brake circuit for the front axle and the rear axle.

For a better understanding of the terms employed below, some term definitions, on which this application is based, are listed first:

Fail-safe property: [source DIN 19 250] Ability of a technical system, when specific failures occur, to remain in the safe state or to change directly into another safe state; also known as fault safety;

Fault [DIN 19 250]: The non-fulfillment of at least one requirement placed on a necessary feature of a unit under consideration;

Fault tolerance: [NTG 3004; Nachrichtentechnische Gesellschaft [Telecommunications Association] in the VDE [Verband Deutscher Elektrotechniker Federation of German Electrical Engineers] (nowadays ITG, Informationstechnische Gesellschaft [Information Technology Association]), Reliability terms in respect of complex software and hardware, 1982] Ability of a system to perform its specified function even with a limited number of faulty subsystem;

Redundancy: [VDI [Verein Deutscher Ingenieure=Union of German Engineers]/VDE 3542; Safety terms for automation systems, 1991] The presence of more than means necessary per se for carrying out the intended tasks.

Fail-silent: The property of a component or of a system which is in communication with others to transmit no further information when a fault within the component or within the system is detected. Vehicles of the type referred to above are generally known. In addition, German patent doc DE 43 34 260 A1 discloses a fail-safe anti-lock system and power-steering system, in which the control unit of one system monitors the functioning of the other system in each case. When a fault occurs in one of the systems, the other cuts off the same system as soon as is safely possible. In this arrangement, there is always a continuous mechanical or hydraulic connection between the service brake on the individual wheels (usually a disc brake with a hydraulically loaded wheel-brake cylinder) and the brake pedal, which can be randomly actuated by the driver, or between the steering linkage and the steering wheel, which can be randomly actuated by the driver. When a fault occurs in the anti-lock brake system or in the power steering, this mechanical connection ensures that the entire system is fail-safe. When a fault occurs in the anti-brake system, braking can still be carried out, with the function of the anti-lock system being dispensed with. If a fault occurs in the assistance afforded by the power steering, then, although the driver has to exert correspondingly higher steering forces, the vehicle nevertheless remains driveable at least to a restricted extent.

Furthermore, International patent document PCT 94/26558 discloses an arrangement for increasing the reliability of the data transmission between two control units by making the data bus connecting these control units redundant (in this particular case at least twofold).

The object of the present invention is to provide an at least fault-tolerant braking and steering system for a vehicle which requires neither a continuous mechanical connection between the steering wheel and the steered wheels, nor a continuous mechanical and/or hydraulic connection between the brake pedal and the service brake for the wheels.

In particular, another object of the invention is to provide a fault-tolerant braking and steering system such that fault tolerance of the entire system is attained, with as low a redundancy as possible of the individual elements of the system, particularly complicated adjusting systems.

In a generic braking and steering system for vehicle having at least two axles, this object is achieved by the control arrangement according to the invention, in which a braking function is performed on each axle for each wheel, and a steering function is performed on at least one axle. A fault-tolerant, preferably redundant, computing unit determines a desired braking effect, at least for each wheel, and a desired steering effect for each wheel with a steering function, in each case in response to sensor signals. The braking function and the steering function for the wheels are regulated or controlled by adjusting systems based on the determined desired braking effect and desired steering effect. The adjusting system for the braking function contains a service brake, and for the steering function also contains a steering adjuster. A fault-tolerant communication device connects the adjusting systems to the computing unit. The energy supply of the computing unit and of the adjusting systems is designed to be fault tolerant.

The designations "axle" and "wheels of one axle" are employed herein, to connote the paired arrangement of wheels on opposite sides of the vehicle. They do not necessarily mean that a continuous axle (rigid axle) is actually present in the conventional mechanical sense. On the contrary, it may also be a question of individually suspended wheels which are completely independent of one another. In this case, the designation "desired steering effect" embraces the desired steering angle 0° (that is, straight ahead) and the designation "desired braking effect" also embraces the desired braking effect "O" (deceleration-free driving).

It is thus sufficient to design the computing unit, the communication device and the energy supply with fault tolerance, in order to make the entire system (which, furthermore, comprises at least the adjusting systems for the steering function and for the braking function) fault-tolerant.

In vehicles equipped with braking and steering system according to the invention, conventional braking mechanism/hydraulics and the conventional steering mechanism can be dispensed with, without the fault tolerance of the entire system being impaired. That is, at least the braking function and the steering function are controlled or regulated purely electrically, so that driver-assistance systems, such as anti-lock brake systems, traction controls, and other systems which, by appropriate activation of the braking function and the steering function, stabilize the yawing behavior of the vehicle and thus prevent the vehicle from skidding, can be incorporated in the computing unit by the simple implementation of corresponding programs.

Furthermore greater freedom in the design of the vehicle is achieved, so that, for example, the protection of the occupants can be improved, the number of versions of the vehicle reduced (vehicles with right-hand and left-hand drive now differ only in the arrangement of the steering wheel and pedals in the vehicle, but no longer in the arrangement of the adjusting systems for the braking function and the steering function) and the design of the engine space and rear axle simplified.

Other objects, advantages and novel features of the present invention will become apparent from the following detailed description of the invention when considered in conjunction with the accompanying drawings.

DESCRIPTION OF THE DRAWING

FIGS. 1a to 1e are schematic depictions of different configurations of the operative connection between adjusting systems for the braking function and for the steering function. For the sake of simplicity and clarity, possible arrangements of the drive devices, and of the spring adjusters of an active or partly active suspension as well as the fault-tolerant communication system, the fault-tolerant computing unit and the fault-tolerant energy supply are not shown. In FIGS. 1a to 1e, the front vehicle axle is designated A1 and the rear vehicle axle A2, whilst the wheels are designated by the letter R followed by either the letter "v" or the letter "h" for front and rear respectively, and "l" or "r" for left and right respectively. The adjusting systems for the steering function are represented diagrammatically as small boxes bearing the letter L, and the adjusting systems for the braking function are represented diagrammatically as small boxes bearing the letter B. Insofar as an adjusting system acts on only one wheel, it has been arranged directly next to the corresponding wheel and the letter "r" is appended to its designation. If an adjusting system for the steering function acts on both wheels of an axle, it has been represented in the middle between the two wheels, an arrow points to the two wheels and the letter "a" is appended to its designation. In the case of the braking function, it is possible to arrange a braking adjuster for one axle, which performs in a braking function for both wheels of the axle, the two braking functions being functionally related to one another. The letter "a" is likewise appended to the designation of braking adjusters of this type.

The functional relationship between the braking functions can, in particular, be that the wheel brakes are connected to a common brake-pressure source. By means of a control valve, although the brake pressure in the wheels can be reduced in relation to the brake pressure in the pressure source, the brake pressure in both is limited, however, by the brake pressure prevailing instantaneously in the pressure source. Moreover, a number is also appended for the purpose of distinguishing between the adjusting systems.

Figure 1A:
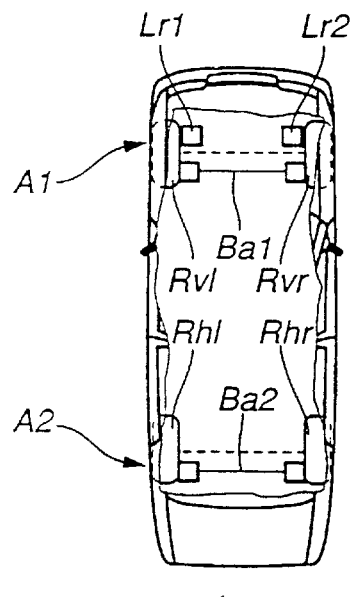
FIGS. 1a to 1e show examples of different configurations of the adjusting systems for function and steering according to the invention, in the example of a four-wheel vehicle.

In FIG. 1a, the vehicle has on the front axle A1 a braking adjuster Ba1 for the axle and two steering adjusters Lr1, Lr2 which work independently of one another, and each of which loads one wheel of the front axle A1. Only one braking adjuster for the axle Ba2 is arranged on the rear axle A2. In such an arrangement, the vehicle is braked on only one axle when a fault occurs on one of the braking adjusters Ba1, Ba2. If a fault occurs on one of the steering adjusters Lr1, Lr2, the other wheel of the front axle A1 is still steered. Preferably, in this case, it is possible, by proper configuration of the device, to ensure that, when a fault occurs, the affected service brake or the affected steering adjuster is cut out. By virtue of the functional relationship existing on each axle, between the braking function on the wheels of such axle, with this embodiment it is not possible (or possible only to a restricted extent) to generate yawing moments by deliberate braking of individual wheels (for example, by means of the computer), in order thereby to continue to maintain steerability when a fault occurs in one of the steering adjusters. Consequently, in such an arrangement, it is possible for the vehicle to drive only at restricted travelling speeds, (for example, at a maximum of 30 km/h). However, it is ensured, in all events, that the vehicle can be stopped in a driver-controllable manner, after a fault has occurred.

Figure 1B:
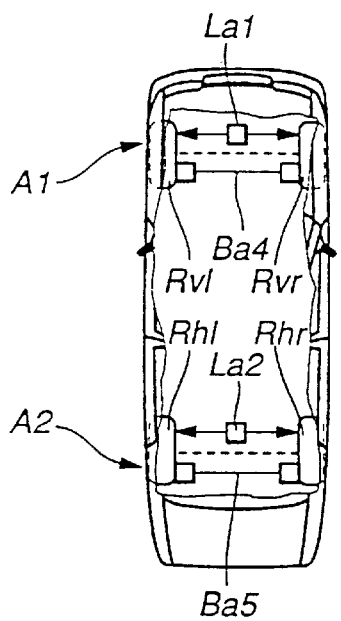

The arrangement according to FIG. 1b differs from the arrangement according to FIG. 1a in that the steering function is performed not only on the front axle A1, but also on the rear axle A2. In this case, the steering function of each axle is performed by a steering adjuster La1, La2, each of the steering adjusters acting on both wheels of the corresponding axle. When a fault occurs in one of the braking adjusters Ba4, Ba5, the vehicle can still be braked by means of the other braking adjuster. The advantage of this arrangement is that the two vehicle axles are steered independently of one another. If a fault occurs in one of the steering adjusters, one of the vehicle axles still continues to be steered. Although this must be taken into account correspondingly in the computing unit, the vehicle nevertheless remains driveable. This arrangement is therefore fault-tolerant with regard to the occurrence of a fault in one of the steering adjusters.

Figure 1C:
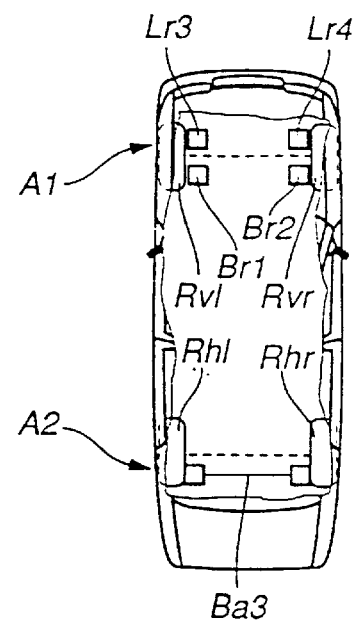

The arrangement of FIG. 1c differs from the arrangement according to FIG. 1a in that, instead of the braking adjuster Ba1, which (as shown in FIG. 1a) performs a functionally related braking of both wheels of the front axle A1, two braking adjusters Br1, Br2 each acting independently of the other, on only one wheel of the axle, are used. If a fault occurs in the braking adjuster Ba3 on the rear axle A2 of the vehicle, the vehicle is still braked via the front axle. If a fault occurs on one of the braking adjusters Br1, Br2 of the front axle A1, the vehicle can still be braked by means of the remaining one of the two braking adjusters Br1, Br2 on the front axle A1 and by means of the braking adjuster Ba3 on the rear axle. Since braking is performed in this case on only one side on the front axle, a yawing moment occurs, which can result in a rotation of the vehicle about the vertical axis in the direction of the side on which the still braked front wheel Rvr or Rvl is located. However, this effect can be compensated by presetting a corresponding desired steering effect. If a fault occurs in one of the two steering adjusters Lr3, Lr4, advantageously a yawing moment can be generated by presetting different desired braking effects for the braking adjusters Br1, Br2. Thus, by deliberate braking on one side, the steering moment on account of the fault in one of the steering adjusters Lr3, Lr4 can be at least partially compensated. Consequently, improved handling of the vehicle is achieved when a fault occurs in one of the steering adjusters Lr3, Lr4. Thus, after a fault has occurred in a steering adjuster, a greater speed range can be employed for the further use of the vehicle. Only the occurrence of a fault which simultaneously affects a braking adjuster and a steering adjuster is so serious that it is recommended, as a safe state after the occurrence of the fault, to bring the vehicle to a standstill. However, stopping the vehicle is still possible in all events, without special demands on the driver. Driving on, even at a restricted vehicle speed, is then not advisable, even though, in principle, it would nevertheless be possible.

Figure 1D:
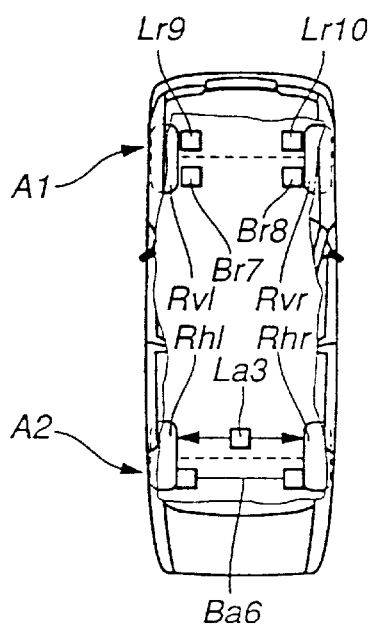

The arrangement according to FIG. 1d differs from the arrangement according to FIG. 1c only in that a steering function is additionally performed on the rear axle A2 by means of the steering adjuster La3 acting on both wheels. This ensures that, if a fault occurs in one of the steering adjusters Lr9, Lr10, La3, an unrestricted steering function can be performed on one vehicle axle. The vehicle is fail-safe even with regard to the occurrence of faults which affect two of the steering adjusters Lr9, Lr10, La3. In this situation at the latest, deliberate one-sided braking on the braking adjusters Br7, Br8 must take place as a result of the presetting of desired braking effects in order to generate a yawing moment on the vehicle and thus compensate for the absence of the steering moment. The behavior of the vehicle when a fault occurs in one of the braking adjusters Br7, Br8, Ba6 is similar to that described when the same fault occurs in FIG. 1c. If faults occur in two adjusting systems, one of which is one of the braking adjusters Br7, Br8, Ba6 and the other of which is one of the steering adjusters Lr9, Lr10, La3, the vehicle can continue to be operated. In contrast to the arrangement according to FIG. 1c, stopping the vehicle as a safe state is not necessary. Full driveability is still afforded, at least within a restricted speed range. Consequently, according to this arrangement, the braking and steering system is fault-tolerant in respect of the occurrence of a fault in any one adjusting system and is at least fail-safe in respect of the occurrence of faults in any two adjusting systems.

Figure 1E:
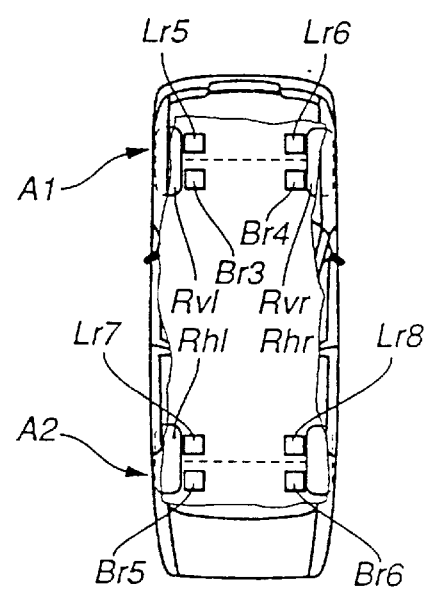

The arrangement according to FIG. 1e has the greatest degree of fault tolerance or fail safety in respect of the occurrence of faults in a plurality of adjusting systems. In this case, each wheel has arranged on it a steering adjuster Lr5, Lr6, Lr7, Lr8 and a braking adjuster Br3, Br4, Br5, Br6 each of which works independently of adjusting systems acting on other wheels. Fault tolerance, up to the occurrence of faults in any two adjusting systems, is thus achieved. If faults occur in three adjusting systems, then an unrestricted driving mode is still possible when at least one steering adjuster and at least one braking adjuster have failed (that is, are affected by a fault). If faults affecting three steering adjusters or three braking adjusters occur, the vehicle can be braked safely to a standstill. However, further driving of the vehicle should then be avoided.

The arrangements of FIGS. 1a, 1c and 1d are not symmetrical in terms of the exchange of the front axle and rear axle. With regard to fail safety, of course, a system which differs only in that "A1" designates the rear axle instead of the front axle and "A2" correspondingly does not designate the rear axle, but the front axle, has the same properties and, from this point of view, can therefore be implemented in exactly the same way.

According to another feature of the invention, the drive device on the wheels of at least one axle of the vehicle is independent of the other drive devices, then a yawing moment can also be generated by means of a different drive power on the two sides of the vehicle, thus a failure of one steering adjuster can be compensated in a manner similar to compensation by means of a braking function. Fail safety as regards the failure of steering adjusters or braking adjusters is thereby further increased, and the failure of a relatively large number of individual components can be compensated in such a way as to guarantee a controllability of the vehicle until the safe state is reached.

The driver must, of course, be informed of the occurrence of a fault in the braking and steering system, so that he can look for a repair facility to correct the fault.

Figure 2:
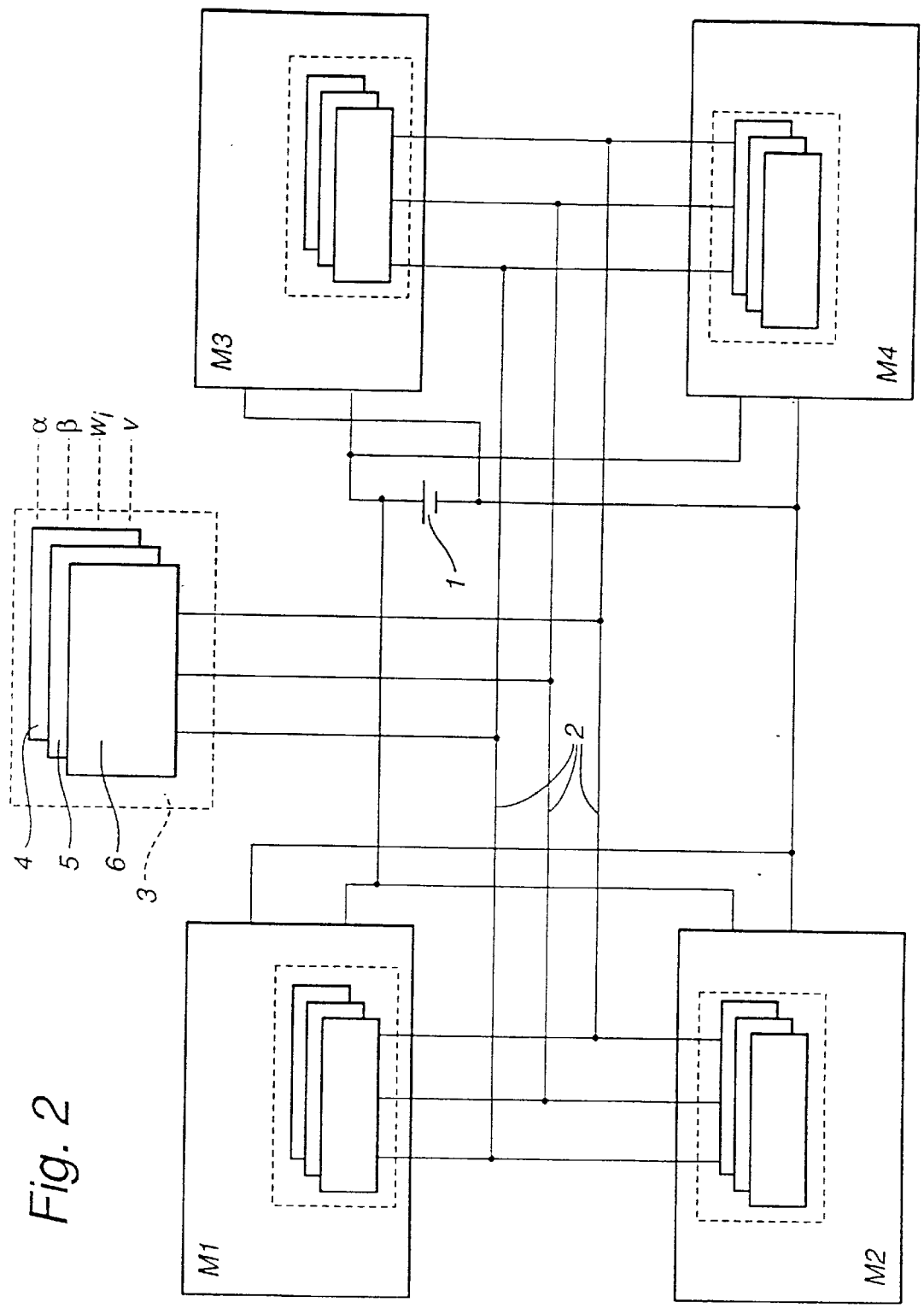
FIG. 2 is a block diagram of a braking and steering system according to the invention.

FIG. 2 is a diagram of the entire arrangement of the braking and steering system according to the invention, in which the adjusting systems on the wheels are represented as modules M1 to M4 (a module being assigned to each wheel). Each of the modules comprises the actuators which are assigned to the corresponding wheels.

Figure 3:
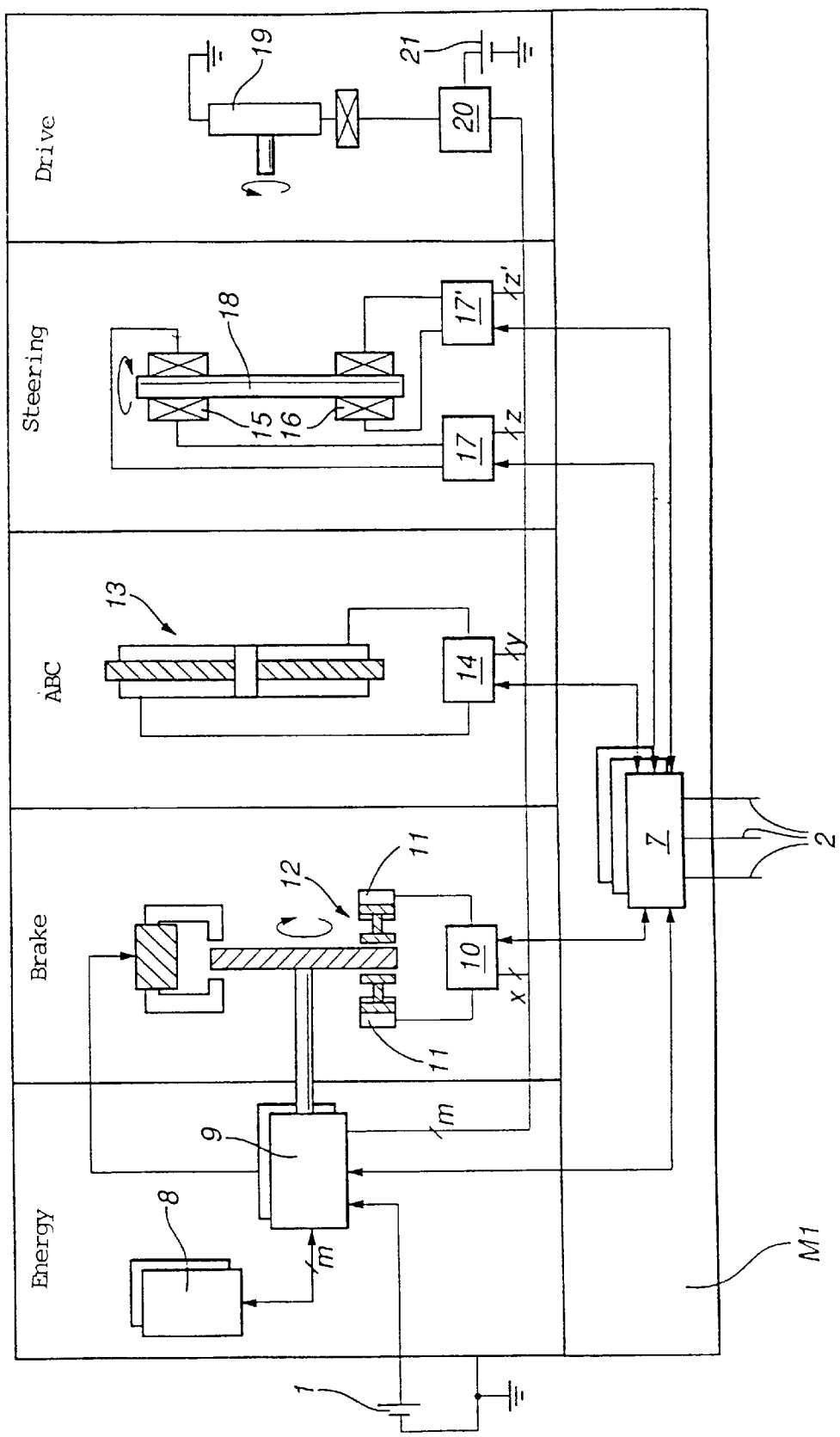
FIG. 3 is a schematic of a module which is assigned to a wheel and which comprises the adjusting systems for this wheel.

An example of a module is represented in FIG. 3. Electrical energy is supplied to the vehicle by the vehicle battery 1 (which in practice is not only a vehicle battery, but, as a rule, the entire system consisting of vehicle battery and generator, and unlike the representation in the drawing, can also be designed to be redundant). The battery 1 serves as an energy supply both for the modules M1 to M4 and for the computing unit 3 (FIG. 2). The computing unit 3 is connected to the fault-tolerant communication system 2, represented diagrammatically in FIG. 3 as a redundantly designed data bus. (In practice, the data bus cables are not routed together, as shown; rather the routes are separated as far as possible.

According to the configuration represented, the computing unit 3 consists of three identical computing devices 4, 5 and 6 (FIG. 2). The quantities measured by sensors, for example the steering angle (of the steering wheel) $\alpha$, the position of the accelerator pedal (Sg), the position of the brake pedal (Sb), the float angle $\beta$, the wheel speeds $\omega_i$ and the vehicle speed v, are fed to the computing unit. In a fault-free operation, after the same algorithms have been executed in the three computing devices 4, 5, 6, the desired values determined coincide. If a fault occurs in one of the computing units, the results determined in the failed computing unit deviate from the results determined in the other two. It is thus possible to recognize whether and in which of the computing units a fault has occurred. The corresponding computing unit is subsequently no longer taken into account, until a check or a repair has been carried out. A brief deviation of the results (for example, less than 0.1 s) does not necessarily have to be evaluated as a fault, if the results subsequently coincide again over a relatively long period of time. If the computing devices are failsilent, single redundancy, that is to say a two-channel design, is sufficient to achieve fault tolerance. The fault-tolerant energy supply is ensured, on the one hand, by the connection to the vehicle battery 1 and, on the other hand, in each case by a further energy accumulator arranged in the wheel module.

FIG. 3 shows the elements of the module M1 of FIG. 2. The energy supply of the module takes place, on the one hand, via the connection to the vehicle battery 1, redundancy being afforded by an energy accumulator 8, which may receive energy from the vehicle power supply (and therefore the generator). On the other hand, it is also possible to uncouple the accumulator 8 from the generator by utilizing a recovery (regenerative) brake 9 at least partially as a service brake. When the energy accumulator 8 is full, additional generated energy can be fed into the vehicle power supply and consequently either the computing unit 3 is supplied with energy or the vehicle battery 1 is charged. Thus, the vehicle battery 1 can thus be charged even in the event of a failure of the generator, since other voltage sources are available in the vehicle. Alternatively (or additionally) to the recovery brake, a converter 9 can be arranged on the wheel, to which the module is assigned. The converter converts the kinetic energy of the wheel into a storable energy form and feeds the energy accumulator 8, and where appropriate, the vehicle battery 1. If both the energy accumulator 8 and the vehicle battery 1 have a sufficient charging state, the converter 9 can be uncoupled. The converter 9 can, for example, be a generator for generating electrical energy or a pump for generating a pressure difference. The energy accumulator 8 is accordingly either a storage cell or a pressure reservoir. If appropriate, the energy which moves the wheel relative to the vehicle body (in the direction of the vertical axis of the vehicle) can also be converted and stored.

The module M1 is suitable not only for performing braking and steering functions, but also for carrying out drive and active suspension functions. The desired values (desired steering angle, desired braking effect, desired spring excursions and desired drive effect), based on which these functions are performed (and, if appropriate, sensor signals) are fed to the wheel module M1 via the fault-tolerant communication device, the data bus 2. The adjusting quantities are determined in a control computer 7 on the basis of the transmitted desired values. Thus, in this case, determination of the adjusting quantities can achieve both a control and a regulation.

The service brake is operated on the basis of the transmitted desired braking effect. If braking is to take place, then a braking effect can first be generated via the recovery brake 9. If the braking effect thus generated is not sufficient, then a disc brake 12 is used as a further part of the service brake, the brake pressure being generated, for example, by a hydraulic pressure source 10 and being fed into the wheel-brake cylinders 11.

If a recovery brake 9 is not present, then the hydraulic disc brake 12 alone serves as a service brake. The generated brake pressure is determined by the control computer 7. In the same way, to control or regulate the braking effect of the recovery brake 9, the current generated by the latter is determined by the control computer 7.

To perform the active suspension function (active and/or partly active suspension), the suspension assigned to this wheel is controlled on the basis of the desired spring excursion. For this purpose, the adjustable spring elements 13 of the wheel are supplied correspondingly with pressure from the hydraulic pressure source 14. In this case, the wheel module can have a single hydraulic pressure source and, if appropriate, a local pressure reservoir; while the module is operating, the control computer 7 controls the supply of pressure to individual pressure-operated actuators via control valves.

The steering adjusters 15, 16, which engage on the corresponding wheel via the steering linkage 18, the steering function. The steering angle of the wheel to be generated is determined on the basis of the desired steering effect and the actual steering angle in the control computer 7 and, under the control of the control units 17, 17', is generated via the steering adjusters 15, 16.

The drive function is performed on the basis of the desired drive effect transmitted to the control computer 7. Based on the desired drive effect and the actual drive torque, the wheel-hub motor 19 is controlled via the power control unit 20. The drive energy for the wheel-hub motor 19 comes from a drive battery 21 which either simultaneously feeds the vehicle power supply or is completely independent of the vehicle power supply.

The modules are preferably designed in such a way that the individual actuators are arranged on the corresponding wheel or, if both wheels of an axle are loaded via one module, on the corresponding axle. The control computer 7, the energy accumulator 8, the hydraulic pressure sources 10, 14, the control units 17, 17' and the power control unit are arranged in a common module housing in as close proximity to the actuators as possible. The module housing protects the elements of the module from environmental influences. At the same time, the module housing, together with its content, forms the smallest exchangeable unit, insofar as a fault occurs in one of its elements. This achieves great simplification in the assembly of the vehicle, in stockkeeping for replacement parts and in repair.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Braking and steering system for a vehicle having at least two axles, a braking function being performed for each wheel on each axle, and a steering function being performed on at least one axle, said braking and steering system comprising:
    at least one fault-tolerant computing unit for determining a desired braking effect for each wheel of said vehicle, and a desired steering effect for each wheel having a steering function, in each case in response to sensor signals;
    at least one braking adjuster, including a service brake for controlling said braking function in response to a desired braking effect and a desired steering effect determined by said computing unit;
    at least one steering adjuster for controlling said steering function in response to a desired steering effect and a desired braking effect determined by said computing unit;
    a fault-tolerant communication device, connecting said adjusters to said computing unit and a fault-tolerant energy supply for the adjusters and the computing unit (3).

2. Braking and steering system according to claim 1, wherein each wheel of at least one axle, on which a steering function is performed, is operatively connected to a steering adjuster which functions independently of any other steering adjuster.

3. Braking and steering system according to claim 1 whereas wheels of at least one axle (A1, A2), on which a steering function is performed, are operatively connected to a common steering adjuster (La1, La2, La3).

4. Braking and steering system according to claim 1 wherein the vehicle has at least two steering adjusters, operatively connected to different wheels, which steering adjusters function independently of one another.

5. Braking and steering system according to claim 1, wherein wheels of at least one axle are each operatively connected to a service brake which functions independently of other service brakes.

6. Braking and steering system according to claim 1, whereas there is a functional relationship between service brakes (Ba1, ..., Ba6) wheels of at least one axle (A1, A2).

7. Braking and steering system according to claim 6 whereas said functional relationship is provided by a common brake pressure source.

8. Braking and steering system according to claim 1, wherein the vehicle has at least two service brakes which function independently of one another, and are operatively connected to wheels of different axles.

9. Braking and steering system according to claim 5, wherein the wheels of axles, on which a steering function is performed, are operatively connected to service brakes which function independently of other service brakes.

10. Braking and steering system according to claim 9, whereas the wheels of axles on which no steering function is performed are operatively connected to service brakes (Ba1, ..., Ba6) which are operated in a functional relationship with one another.

11. Braking and steering system according to claim 10 whereas said service brakes are connected to a common brake-pressure source.

12. Braking and steering system according to claim 1 wherein, the fault-tolerant energy supply comprises a vehicle battery and at least one other energy accumulator, whereby the adjusters assigned to the individual wheel are supplied by at least two energy accumulators independent of one another.

13. Braking and steering system according to claim 12, wherein an energy accumulator independent of other energy accumulators is assigned to each adjusting system.

14. Braking and steering system according to claim 13, an energy accumulator (8) which supplies an adjuster for braking of a specific wheel of an axle (A1, A2), on which a steering function is performed, also supplies the (Lr1, ..., Lr10, La1, La2, La3) for the adjuster (Lr1, ..., Lr10, La1, La2, La3) for the steering of said specific wheel.

15. Braking and steering system according to claim 12, energy accumulators (8), assigned to an individual wheel, are charged at least partially by electrical energy from the kinetic recovered during braking operations energy of a corresponding wheel.

16. Braking and steering system according to claim 12, whereas at least one energy accumulator (8) can be charged from the kinetic energy of a wheel.

17. Braking and steering system according to claim 1, whereas an active suspension function is performed for each wheel, by means of an active or partly active suspension, desired spring excursions being determined for each wheel in the computing unit in response to sensor signals, active suspension being controlled by means of spring adjusters (13) on the basis of said desired spring excursions.

18. Braking and steering system according to claim 1 wherein:

said vehicle has an electrical drive device at least for the wheels of one axle of the vehicle;

the computing unit determines a desired drive effect for wheels having a drive function; and the drive function is controlled based on a determined desired drive effect.

19. Braking and steering system according to claim 18, wherein a drive device independent of other drive devices is arranged for each wheel on at least one axle having a drive function.

20. Braking and steering system according to claim 18 wherein said vehicle has a drive device which acts equally on both wheels of the axle on at least one of the axles having a drive function.

21. Braking and steering system according to claim 1, wherein one of said adjusters is assigned to a specific wheel, and an associated control as well as a further energy accumulator which solely supplies this specific wheel, are combined to form a module.

22. Braking and steering system according to claim 1, wherein:

adjusters are assigned to all wheels of a specific axle; and an associated control, and a further energy accumulator solely supply the specific axle, and are combined to form a module.

23. Braking and steering system according to claim 1, wherein the fault-tolerant communication system is a data bus.

24. Braking and steering system according to claim 23, wherein the data bus is designed redundantly.

25. Braking and steering system according to claim 23, wherein the data bus is designed as a ring or as a star.

26. Braking and steering system according to claim 1, wherein the fault-tolerant computing unit comprises at least three identical computing devices which function independently of one another, each of which computing devices determines at least a desired braking and a desired steering independently of other computing devices, in response to the source signals fed to all computing devices.

27. Braking and steering system according to claim 1, wherein:

the fault-tolerant computing unit comprises at least two computing devices which function independently of one another;

each computing device has a fail-silent property; and at least a desired braking and a desired steering are determined independently by each of the computing devices in response to the sensor signals fed to all computing units.

* * * * *